(12) United States Patent  
Yokose

(10) Patent No.: US 9,161,047 B2  
(45) Date of Patent: Oct. 13, 2015

(54) IMAGE ENCODING APPARATUS AND METHOD, IMAGE DECODING APPARATUS, AND NON-TRANSITORY COMPUTER READABLE MEDIUM

(71) Applicant: FUJI XEROX CO., LTD., Minato-ku, Tokyo (JP)

(72) Inventor: Taro Yokose, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 79 days.

(21) Appl. No.: 14/024,263

(22) Filed: Sep. 11, 2013

(65) Prior Publication Data

US 2014/0212058 A1 Jul. 31, 2014

(30) Foreign Application Priority Data

Jan. 25, 2013 (JP) ................................. 2013-012392

(51) Int. Cl.
*G06K 9/36* (2006.01)
*H04N 19/34* (2014.01)

(52) U.S. Cl.
CPC ...................................... *H04N 19/34* (2014.11)

(58) Field of Classification Search
None
See application file for complete search history.

(56) References Cited

U.S. PATENT DOCUMENTS

| 5,303,372 | A | * | 4/1994 | Oliver et al. | .................. | 382/238 |
| 6,298,367 | B1 | * | 10/2001 | Oberman et al. | ............. | 708/524 |
| 6,571,267 | B1 | * | 5/2003 | Yoshioka | ...................... | 708/505 |
| 6,724,816 | B1 | * | 4/2004 | Kim et al. | ................ | 375/240.03 |
| 2008/0030384 | A1 | | 2/2008 | Yokose et al. | | |
| 2008/0205521 | A1 | * | 8/2008 | Van Der Vleuten | ..... | 375/240.14 |
| 2009/0238270 | A1 | * | 9/2009 | Nishi | ........................ | 375/240.12 |
| 2011/0170794 | A1 | * | 7/2011 | Ogawa et al. | ................. | 382/251 |
| 2011/0200263 | A1 | | 8/2011 | Ogawa | | |

FOREIGN PATENT DOCUMENTS

| JP | 63-076684 | A | 4/1988 |
| JP | 03-112273 | A | 5/1991 |
| JP | 2008-067351 | A | 3/2008 |
| JP | 2008-067361 | A | 3/2008 |
| JP | 2010-166520 | A | 7/2010 |

* cited by examiner

*Primary Examiner* — Andrae S Allison
(74) *Attorney, Agent, or Firm* — Sughrue Mion, PLLC

(57) ABSTRACT

An image encoding apparatus includes an input unit that receives image data; a prediction unit that calculates a predicted pixel value of a pixel of interest to be processed in the image data; a prediction error calculating unit that calculates a prediction error value by using an actual pixel value and the predicted pixel value of the pixel of interest; a main encoder that encodes the prediction error value with information including a number of bits and an error value, the main encoder encoding, as the error value, only one or more most significant bits corresponding to a number of effective bits when the number of bits exceeds the number of effective bits; and an additional encoder that encodes one or more least significant bits of the prediction error value, excluding the one or more most significant bits corresponding to the number of effective bits, as an additional error value.

16 Claims, 12 Drawing Sheets

FIG. 3
| ERROR | BINARY REPRESENTATION | NUMBER OF BITS | BIT PACK | ENCODING ERROR | ADDITIONAL BIT PACK |
|---|---|---|---|---|---|
| 4 | 0b00000100 | 4 | 0001 | 4 | 00 |
| 5 | 0b00000101 | 4 | 0001 | 4 | 01 |
| 26 | 0b00011010 | 6 | 0110 | 24 | 10 |
| -3 | 0b11111101 | 3 | 1111 | -4 | 01 |
FIG. 4A
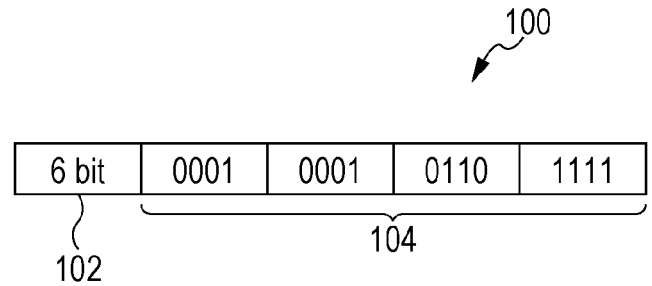
FIG. 4B
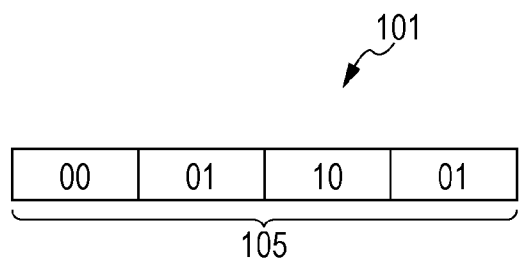

FIG. 6
| ERROR | BINARY REPRESENTATION | NUMBER OF BITS | BIT PACK | ENCODING ERROR | ADDITIONAL BIT PACK |
|---|---|---|---|---|---|
| 4 | 0b00000100 | 4 | 0001 | 4 | 00 |
| 5 | 0b00000101 | 4 | 0001 | 4 | 01 |
| 26 | 0b00011010 | 6 | 0111 | 28 | 10 |
| -3 | 0b11111101 | 3 | 1111 | -4 | 01 |
FIG. 7A
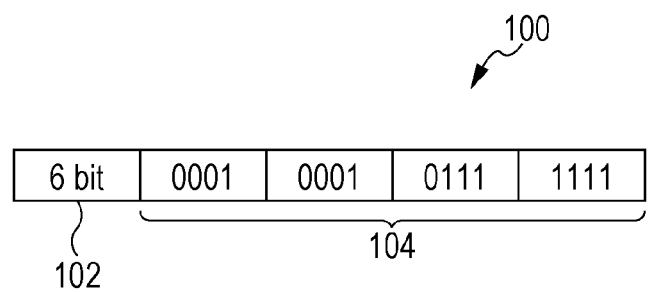
FIG. 7B
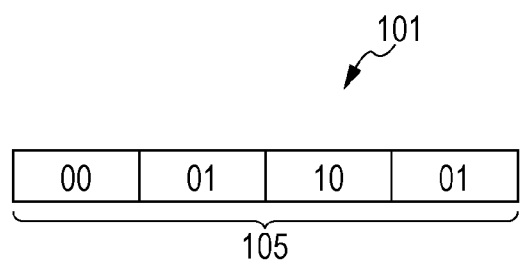

FIG. 9

| NUMBER OF BITS | MAIN CODE | ADDITIONAL CODE |
|---|---|---|
| 1 | 1 | 0 |
| 2 | 2 | 0 |
| 3 | 3 | 0 |
| 4 | 4 | 0 |
| 5 | 4 | 1 |
| 6 | 4 | 2 |
| 7 | 4 | 3 |
| 8 | 4 | 4 |

FIG. 11A

BIT CODE | 6 bit |

FIG. 11B

MAIN CODE | 0001 | 0001 | 0110 | 1111 |

FIG. 11C

ADDITIONAL CODE | 00 | 01 | 10 | 01 |

FIG. 14

| | CODE TRANSFER | ASSUMPTION | FEATURE | EXEMPLARY USE CASE |
|---|---|---|---|---|
| EXTENSION CASE 1 (QUANTIZED OUTPUT) | MAIN CODES ONLY | — | — | MAIN CODES AND ADDITIONAL CODES ARE PREPARED AT SERVER, AND CODES ARE TRANSFERRED WITH IMAGE QUALITY IN RESPONSE TO CLIENT'S REQUEST |
| EXTENSION CASE 1 (REVERSIBLE OUTPUT) | MAIN CODES + ADDITIONAL CODES | — | — | |
| EXTENSION CASE 2 | ADDITIONAL CODES ONLY | QUANTIZED IMAGE HAS ALREADY BEEN GENERATED; MAIN CODES ARE HELD AND INPUT AGAIN | ○ CONFIGURATION IS EASY<br>△ MAIN CODES ARE EXTENDED TWICE | MAIN CODES ARE UNCONDITIONALLY TRANSFERRED FROM SERVER, AND ADDITIONAL CODES ARE TRANSFERRED IN RESPONSE TO CLIENT'S ADDITIONAL REQUEST |
| EXTENSION CASE 3 | ADDITIONAL CODES ONLY | QUANTIZED IMAGE HAS ALREADY BEEN GENERATED; BIT CODE IS HELD AND INPUT AGAIN | ○ PROCESSING IS LIGHT<br>△ CODE IMPROVEMENT IS NEEDED | |
| EXTENSION CASE 4 | ADDITIONAL CODES ONLY | QUANTIZED IMAGE HAS ALREADY BEEN GENERATED | ○ UNNECESSARY TO HOLD CODES<br>△ COMPRESSION PROCESSING IS PARTIALLY NEEDED | |

LEGEND
○ : ADVANTAGE
△ : DISADVANTAGE

IMAGE ENCODING APPARATUS AND METHOD, IMAGE DECODING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-012392 filed Jan. 25, 2013.

BACKGROUND (i) Technical Field

The present invention relates to an image encoding apparatus and method, an image decoding apparatus, and a non-transitory computer readable medium.

(ii) Related Art

Hitherto, various systems for encoding or compressing images have been proposed. Such systems include Joint Photographic Experts Group (JPEG) and Block Truncation Coding (BTC). The former is a variable-length encoding system, which reduces the encoding amount while keeping image quality deterioration at a low level by combining frequency conversion and quantization. The latter is a fixed-length encoding system, which is capable of encoding an image to a certain fixed encoding amount by representing a block with information of a fixed length.

In the JPEG system, the upper limit of the encoding amount is not controlled, and the size of an apparatus tends to increase when multiple lines (such as eight lines) of an image are processed at the same time. Also, the BTC system produces a fixed encoding amount even in response to an input with a small information amount.

In some network environments, it may be assumable that, after a compressed image is sent, the image quality thereof is desired to be changed later. For example, it is desirable in a narrowband network environment to have a function of firstly sending a rough image and then sending the same image with an improved image quality again. This function demands securing of the upper limit without having an overhead of the amount of encoding, and compression in which the image quality is, for example, reversibly changeable.

SUMMARY

According to an aspect of the invention, there is provided an image encoding apparatus including an input unit, a prediction unit, a prediction error calculating unit, a main encoder, and an additional encoder. The input unit receives, as an input, image data. The prediction unit calculates a predicted pixel value of a pixel of interest serving as a target to be processed in the image data. The prediction error calculating unit calculates a prediction error value by using an actual pixel value and the predicted pixel value of the pixel of interest. The main encoder encodes the prediction error value with information including a number of bits and an error value, the main encoder encoding, as the error value, only one or more most significant bits corresponding to a number of effective bits when the number of bits exceeds the number of effective bits. The additional encoder encodes one or more least significant bits of the prediction error value, excluding the one or more most significant bits corresponding to the number of effective bits, as an additional error value.

BRIEF DESCRIPTION OF THE DRAWINGS

Exemplary embodiments of the present invention will be described in detail based on the following figures, wherein:

FIG. 3 is a diagram describing the number of bits and bit packing;

FIGS. 4A and 4B are diagrams illustrating examples of encoded image data;

FIG. 6 is an explanatory diagram of the number of bits and bit packing according to a second exemplary embodiment;

FIGS. 7A and 7B are diagrams illustrating examples of encoded image data of the second exemplary embodiment;

FIG. 9 is a diagram illustrating the relationship among the number of bits, a main code, and an additional code;

FIGS. 11A to 11C are diagrams illustrating examples of a bit code, a main code, and an additional code, respectively, according to a fifth exemplary embodiment;

FIG. 14 is an explanatory diagram of various image decoding systems.

DETAILED DESCRIPTION

Hereinafter, exemplary embodiments of the invention will be described on the basis of the drawings.

First Exemplary Embodiment

Figure 1:
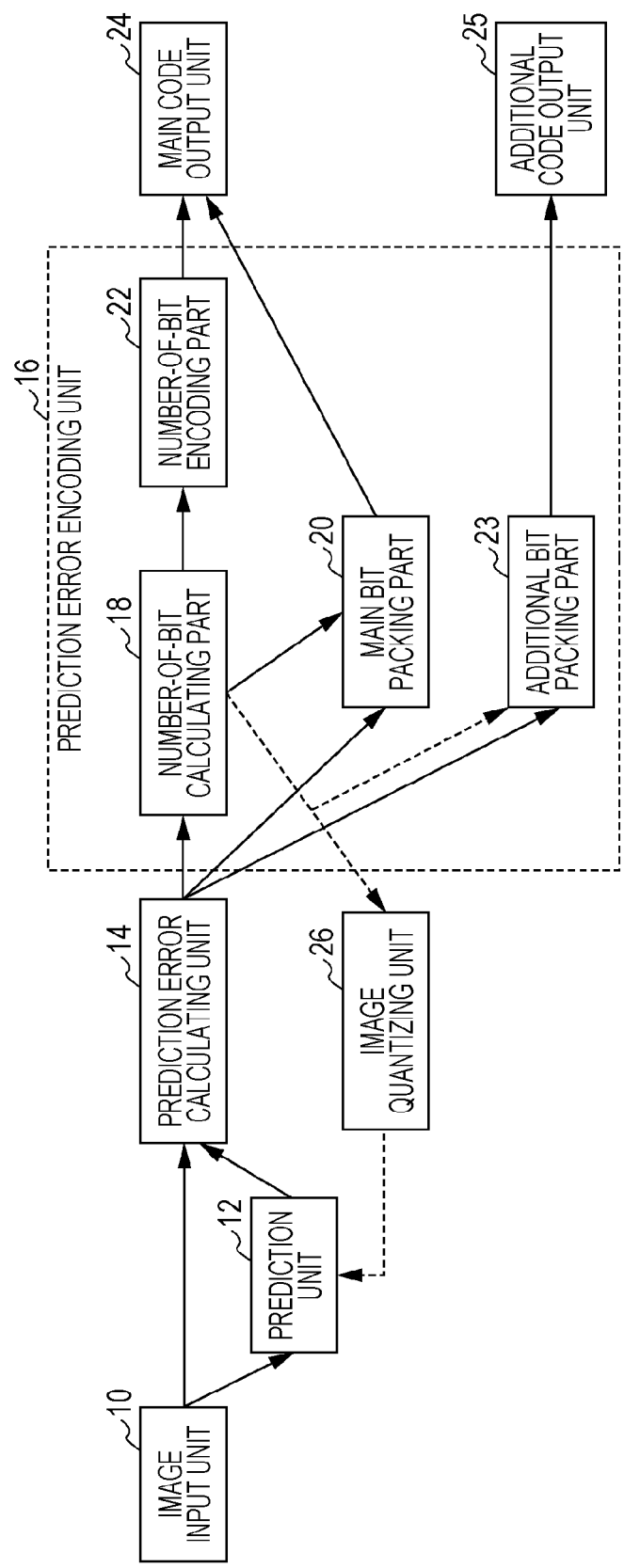
FIG. 1 is a block diagram illustrating the configuration of an image encoding apparatus according to a first exemplary embodiment.

FIG. 1 is a block diagram illustrating the configuration of an image encoding apparatus according to a first exemplary embodiment. The image encoding apparatus includes an image input unit 10, a prediction unit 12, a prediction error calculating unit 14, a prediction error encoding unit 16, a main code output unit 24, an additional code output unit 25, and an image quantizing unit 26.

The image input unit 10 obtains image data to be processed. An example of the image input unit 10 includes a scanner that scans a document and converts the document into electronic data. The image input unit 10 outputs the obtained image data to the prediction unit 12 and to the prediction error calculating unit 14.

The prediction unit 12 predicts the pixel value of a pixel of interest, that is, a pixel to be processed. For example, when performing line-by-line processing, the prediction unit 12 uses the pixel values of a line previous to a line of interest as predicted values. More particularly, the horizontal line direction serves as a fast scanning direction, and the vertical line direction or a direction orthogonal to the fast scanning direction serves as a sub scanning direction. When processing is performed from top to bottom, the pixel values of a line one above a line of interest serves as predicted values. Needless to say, this is only an example. Another method such as that uses the pixel value of a pixel to the left of a pixel of interest as a predicted value when pixel-by-pixel processing is performed is possible.

The prediction error calculating unit 14 calculates the difference between the predicted value predicted by the prediction unit 12 and the actual pixel value of the pixel of interest. For example, when the predicted value of the pixel of interest is 16 and the actual pixel value of the pixel of interest is 20, a prediction error is calculated as: 20−16=4. The prediction error calculating unit 14 outputs the calculated prediction error to the prediction error encoding unit 16.

The prediction error encoding unit 16 encodes the prediction error calculated by the prediction error calculating unit 14. The prediction error encoding unit 16 includes a number-of-bit calculating part 18, a main bit packing part 20, a number-of-bit encoding part 22, and an additional bit packing part 23.

The number-of-bit calculating part 18 calculates the number of bits that are capable of representing the prediction error value calculated by the prediction error calculating unit 14. For example, when the prediction error value is 4, since 4 is 0100 in binary, the number-of-bit calculating part 18 calculates the number of bits as 4. When the prediction error value is 26, since 26 is 011010 in binary, the number-of-bit calculating part 18 calculates the number of bits as 6. When calculating the number of bits of the prediction error value, the number-of-bit calculating part 18 calculates the number of bits by including the sign bit because the prediction error value may be a negative value. Among the numbers of bits of prediction errors of pixels to be processed, the number-of-bit calculating part 18 outputs the maximum number of bits to the number-of-bit encoding part 22 and the main bit packing part 20. For example, when the numbers of bits that are capable of representing the prediction error values of pixels are 4 bits, 5 bits, and 6 bits, the number-of-bit calculating part 18 selects 6 bits, which is the maximum number of bits, as the number of bits.

The number-of-bit encoding part 22 encodes the number of bits calculated by the number-of-bit calculating part 18.

The main bit packing part 20 calculates the number of effective bits on the basis of the number of bits calculated by the number-of-bit calculating part 18, and, with this number of effective bits, packs the prediction error values of the pixels in units of blocks. When packing a prediction error value, if the number of bits of the prediction error value exceeds the number of effective bits, the main bit packing part 20 adopts only one or more most significant bits corresponding to the number of effective bits as the prediction error value. For example, given the number of effective bits as 4 bits, when the prediction error value is 26, since 26 is "011010" in binary, which is 6 bits exceeding 4 bits, the main bit packing part 20 adopts only the four most significant bits "0110" of the 6 bits of the prediction error. Note that in this case, the two least significant bits "10" of the original 6 bits are truncated.

Adopting only one or more most significant bits corresponding to the number of effective bits in the case where the number of bits of the prediction error value exceeds the number of effective bits is based on the fact that useful information is included in the most significant bits of the prediction error value.

Meanwhile, information is lost by adopting only one or more most significant bits corresponding to the number of effective bits, and reversibility is lost. In this case, it is incapable of fulfilling a user's request later for an image with a good image quality.

Therefore, when the number of bits of the prediction error value exceeds the number of effective bits, the additional bit packing part 23 packs the least significant bit(s) in units of blocks. For example, given the number of effective bits as 4 bits, when the prediction error value is 26, since 26 is "011010" in binary, which is 6 bits exceeding 4 bits, the main bit packing part 20 adopts only the four most significant bits "0110" of the 6 bits of the prediction error. Also, the additional bit packing part 23 packs the two least significant bits "10" out of the original 6 bits of the prediction error as an additional error value.

The main code output unit 24 outputs the encoded number of bits from the number-of-bit encoding part 22 and the packed prediction error values from the main bit packing part 20 as encoded image data.

Also, the additional code output unit 25 outputs the packed additional error values from the additional bit packing part 23. The additional code output unit 25 may perform output in or out of synchronization with an output from the main code output unit 24. An example in which the additional code output unit 25 performs output out of synchronization with an output from the main code output unit 24 is that, in response to the user's request, the additional code output unit 25 outputs the additional error values at an arbitrary timing after an output from the main code output unit 24. By using the additional error values output afterwards, the user may improve the image quality by reversibly decoding the image.

In contrast, the image quantizing unit 26 calculates a quantization error that has occurred in the main bit packing part 20. The calculated quantization error is sent as a feedback to the prediction unit 12. In other words, the image quantizing unit 26 has the function of calculating a quantization error and the function of sending the quantization error as a feedback to the prediction unit 12.

For example, when the prediction error value of the pixel of interest is "4", the image quantizing unit 26 outputs this prediction error value as an encoding error to the prediction unit 12. The prediction unit 12 uses this encoding error "4" when calculating the predicted value of the next pixel of interest. Specifically, the predicted value of the next pixel of interest is the pixel value of a pixel previous to this next pixel of interest. The predicted value of the next pixel of interest is modified by adding the encoding error to this pixel value of the previous pixel of the next pixel of interest. When the prediction error of the pixel of interest is "26", "26" is packed by the main bit packing part 20 and the prediction error value becomes "0110"=24. This encoding error "24" is output to the prediction unit 12. The prediction unit 12 uses this encoding error "24" when calculating the predicted value of the next pixel of interest.

The prediction unit 12, the prediction error calculating unit 14, the prediction error encoding unit 16, the main code output unit 24, the additional code output unit 25, and the image quantizing unit 26 illustrated in FIG. 1 are specifically configured with a processor such as a central processing unit (CPU) and memories included in a computer. The processor reads a program stored in a program memory, such as a read-only memory (ROM), and executes the program, thereby realizing the functions of each of the units. An image encoding apparatus illustrated in FIG. 1 is connected to each terminal via a network and may be incorporated in a multifunctional machine with a scanner function, a print function, and the like.

Next, an encoding process of the first exemplary embodiment will be specifically described.

Figure 2:
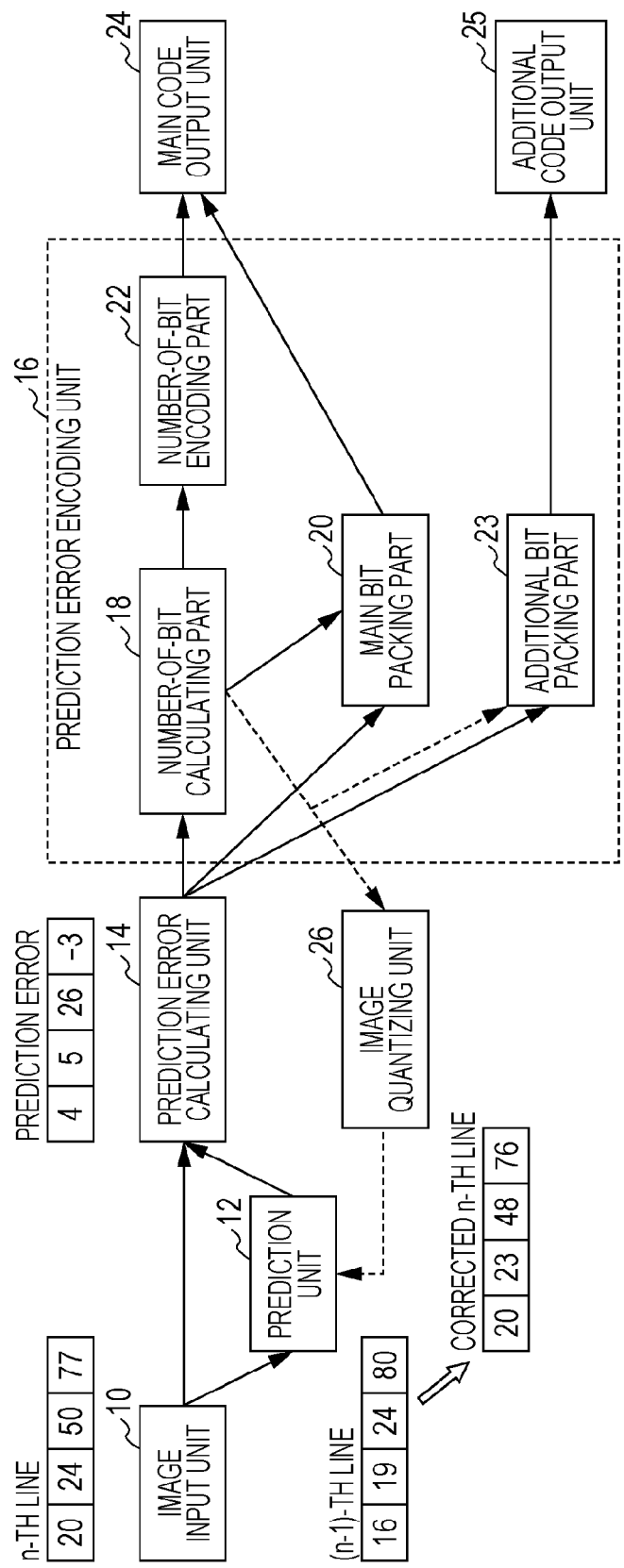
FIG. 2 is a diagram illustrating a specific example of the configuration illustrated in FIG. 1.

FIG. 2 illustrates a specific example of an encoding process performed by the configuration illustrated in FIG. 1. It is assumed that the image input unit 10 obtains an image, and, as a result, the pixel values of pixels constituting the (n−1)-th line of the image are, for example, "16", "19", "24", "80", . . . , and the pixel values of pixels constituting the n-th line are, for example, "20", "24", "50", "77", . . . . Encoding is performed in units of blocks. A processing block is constituted of 32 pixels×1 line.

The prediction unit 12 predicts the pixel values of pixels of the n-th line, which is a line of interest, from the pixels of the (n−1)-th line, which is one above the n-th line or the line of interest. For example, the prediction unit 12 predicts the pixel values of the n-th line as the pixel values of the (n−1)-th line as they are, and predicts the pixel values of the n-th line as "16", "19", "24", "80", . . . . The actual pixel values of the n-th line, which are from the image input unit 10, and the predicted values of the n-th line, which are from the prediction unit 12, are both supplied to the prediction error calculating unit 14.

The prediction error calculating unit 14 calculates prediction error values by calculating the differences between the actual pixel values and the predicted values of the n-th line. Here,
the actual pixel values=20, 24, 50, 77; and
the predicted values=16, 19, 24, 80
Thus, the prediction error values are 20−16=4, 24−19=5, 50−24=26, and 77−80=−3. The calculated prediction error values "4", "5", "26", and "−3" are supplied to the prediction error encoding unit 16.

FIG. 3 illustrates an example of encoding performed by the prediction error encoding unit 16. The prediction error value "4" is represented with 8 bits as "0b00000100" in binary, and the number of bits that are capable of representing "0b00000100" including the sign bit is 4 bits. The prediction error value "5" is represented with 8 bits as "0b00000101" in binary, and the number of bits that are capable of representing "0b00000101" including the sign bit is 4 bits. The prediction error value "26" is represented with 8 bits as "0b00011010" in binary, and the number of bits that are capable of representing "0b00011010" including the sign bit is 6 bits. The prediction error value "−3" is represented with 8 bits as "0b11111101" in binary, and the number of bits that are capable of representing "0b11111101" including the sign bit is 3 bits. Among these numbers of bits, the number-of-bit calculating part 18 selects the maximum number of bits, namely, 6 bits.

The main bit packing part 20 limits the number of effective bits to, for example, "4", which is set in advance, and packs the prediction error values with this number of effective bits. At this time, the numbers of bits of the prediction error values to be packed are "4", "4", "6", and "3". Since "6", which exceeds the number of effective bits "4", is included, only the four most significant bits, corresponding to the number of effective bits, are adopted in order to reduce the number of bits to "4", which is the number of effective bits. That is, the prediction error value "4" is "0b00000100" in binary. Among the six bits "000100", the two least significant bits are truncated, and the four most significant bits are extracted to obtain "0001". Also, the prediction error value "5" is "0b00000101" in binary. Among the six bits "000101", the two least significant bits "01" are truncated, and only the four most significant bits are extracted to obtain "0001". Also, the prediction error value "26" is "0b00011010" in binary. Among the six bits "011010", the two least significant bits "10" are truncated, and only the four most significant bits are extracted to obtain "0110". Also, the prediction error value "−3" is "0b11111101" in binary. Among the six bits "111101", the two least significant bits "01" are truncated, and only the four most significant bits are extracted to obtain "1111".

As above, the prediction error values "4", "5", "26", and "−3" are encoded to "0001", "0001", "0111", and "1111", respectively, with 4 bits, which is the number of effective bits.

In contrast, encoding errors involved in the encoding above are as follows. That is, "0001" is the result of truncating the two least significant bits; the two least significant bits are added to "0001" to obtain 8-bit "00000100". Thus, the encoding error is "00000100"="4". Also, the two least significant bits are added to "0110" to obtain 8-bit "00011000"="24". Also, the two least significant bits are added to "1111" to obtain 8-bit "11111100"="−4". In FIG. 3, the encoding errors of the prediction error values "4", "5", "26", and "−3" are indicated as "4", "4", "24", and "−4", respectively. The image quantizing unit 26 calculates these encoding error values and sends the encoding error values as a feedback to the prediction unit 12.

Also, since the additional bit packs are the truncated two least significant bits themselves, the additional bit packs are "00", "01", "10", and "01" with respect to the prediction error values "4", "5", "26", and "−3", respectively.

Referring back to FIG. 2, when the image quantizing unit 26 calculates the encoding errors and sends the encoding errors as a feedback to the prediction unit 12, the prediction unit 12 uses the encoding errors to modify the pixel values of the n-th line, which serve as a reference, when calculating the predicted values of the (n+1)-th line, which is the next line. That is, the prediction unit 12 assumes the predicted values of the n-th line as "16", "19", "24", and "80", which are the pixel values of the (n−1)-th line. The prediction unit 12 adds the encoding error values "4", "4", "24", and "−4" to "16", "19", "24", and "80", thereby modifying the pixel values of the n-th line. The pixel values of the modified n-th line become 16+4=20, 19+4=23, 24+24=48, and 80−4=76. In FIG. 2, these modified pixel values are indicated as the pixel values of the modified n-th line. The prediction unit 12 calculates these pixel values of the modified n-th line as the predicted values of the (n+1)-th line, which is the next line of interest, and outputs these pixel values to the prediction error calculating unit 14. That is, the prediction unit 12 encodes the n-th line, and then calculates the predicted values of the (n+1)-th line, which is the next line of interest, by using the encoding errors of the n-th line. By modifying the predicted values using the encoding errors, accumulation of the encoding errors is effectively suppressed.

FIG. 4A illustrates an example of encoded data (encoded image data) 100 output from the main code output unit 24, and FIG. 4B illustrates an example of additional code data 101 output from the additional code output unit 25. The encoded prediction error values "0001", "0001", "0110", and "1111" are packed in units of blocks to constitute an error part 104, and a header 102 defining 6 bits, which is the maximum number of bits of the prediction errors of a corresponding block, is added at the beginning. That is, the encoded data 100 includes the encoded prediction error values and is constituted of the number of bits and error values. Error values are limited to 4 bits, which is the number of effective bits, and errors with the number of bits greater than 4 bits do not exist. Therefore, the upper limit of the encoding amount is guaranteed for sure. In the JPEG system of the related art, the upper limit of the encoding amount is not controlled, which is distinctively different from the image encoding apparatus of the first exemplary embodiment. Also, the number of effective bits is set in accordance with, for example, the dynamic range of prediction error values. Accordingly, the number of effective bits is appropriately set to a small value for an input with a small amount of information, thereby controlling the average encoding amount.

Meanwhile, the additional code data 101 includes a two-least-significant-bit group 105. Using the additional code data 101 and the two-least-significant-bit group 105, the original image is decoded with a high image quality. There is no header, defining the number of bits, at the beginning of the additional code data 101. The reason is that the number of bits of an additional code is calculatable from the maximum number of bits defined in the header 102 of the encoded data 100 and the number of effective bits indicated in the error part 104. Specifically, when the number of bits defined in the header 102 is 6 bits and the number of effective bits is 4 bits, which is determined in advance, the number of bits of an additional code is calculated as: 6−4=2 bits. Needless to say, the number of bits of an additional code may be defined in the header of the additional code data 101 without performing such an arithmetic operation.

Figure 5:
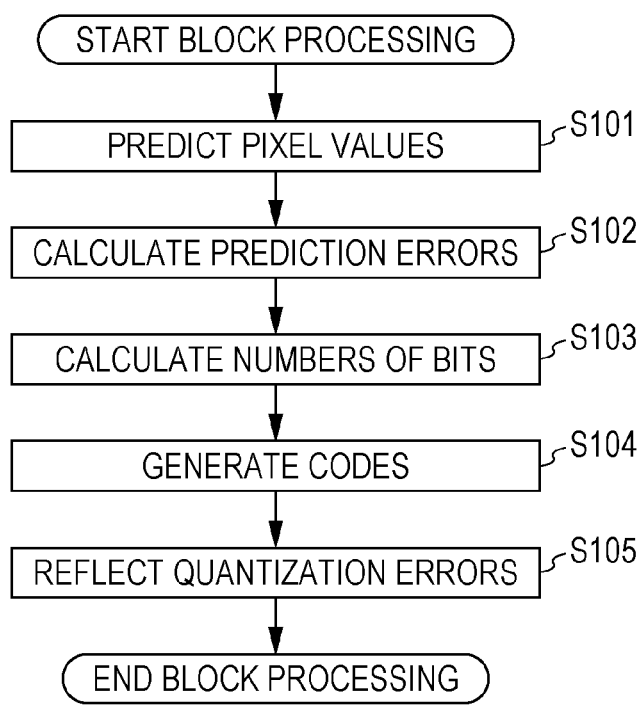
FIG. 5 is a flowchart of a process of the first exemplary embodiment.

FIG. 5 is a flowchart of an encoding process of the first exemplary embodiment. At first, the prediction unit 12 predicts pixel values (S101). A prediction method is arbitrary. For example, the pixel values of the (n−1)-th line, which is one above the n-th line serving as the line of interest, are used as the predicted values of the n-th line.

Next, the prediction error calculating unit 14 calculates prediction errors (S102). Specifically, the prediction error calculating unit 14 calculates prediction error values by calculating the differences between the actual pixel values and the predicted pixel values of the line of interest.

Next, the number-of-bit calculating part 18 calculates the numbers of bits (the numbers of necessary bits (S103). That is, the number-of-bit calculating part 18 calculates the minimum numbers of bits required to represent the prediction error values. As above, when the prediction error values are "4", "5", "26", and "−3", the numbers of bits that are capable of representing "4", "5", "26", and "−3", including the sign bit, are 4 bits, 4 bits, 6 bits, and 3 bits, respectively. Among these bits, 6 bits, which is the maximum number of bits, is selected. Alternatively, a preset fixed value may be used as the number of effective bits. Alternatively, the number of effective bits may be set appropriately in accordance with the dynamic range of the prediction error values. In this example, it is assumed that the number of effective bits is set to "4" in advance.

Next, the main bit packing part 20 and the number-of-bit encoding part 22 encode the prediction error values and the number of bits, respectively, and the additional bit packing part 23 encodes the additional bits (S104). That is, the prediction error values of the line of interest are encoded and packed with 4 bits, which is the number of effective bits, and 6 bits, which is the maximum number of bits, are encoded and added as a header at the beginning. Also, the remaining least significant bits of the prediction error values of the line of interest are encoded and packed.

Next, the image quantizing unit 26 calculates quantization errors, that is, encoding errors, and sends the quantization errors or encoding errors as a feedback to the prediction unit 12. The prediction unit 12 reflects the encoding errors in the predicted values of the (n+1)-th line, which is the next line of interest (S105). Accumulation of errors is suppressed by reflecting the encoding errors in the predicted values of the next line.

Note that, in the first exemplary embodiment, a group of pixels constituting a line is treated as a block, and the encoding process is executed in units of blocks. Alternatively, the encoding process may be executed in units of pixels, instead of blocks.

Also, in the first exemplary embodiment, the prediction unit 12 predicts the pixel values of the next line of interest without using already processed pixels. Alternatively, the pixel values of the next line of interest may be predicted by using already processed pixels.

Second Exemplary Embodiment

In the above-described first exemplary embodiment, the two least significant bits of a prediction error value are truncated, and the four most significant bits are encoded. Alternatively, the two least significant bits may be rounded off, instead of truncated, and the four most significant bits may be encoded.

FIG. 6 illustrates the relationship among the prediction error values, bit packs, and additional bit packs in this case. The prediction error value "4" is represented with 8 bits as "0b00000100" in binary, and the number of bits that are capable of representing "0b00000100" including the sign bit is 4 bits. The prediction error value "5" is represented with 8 bits as "0b00000101" in binary, and the number of bits that are capable of representing "0b00000101" including the sign bit is 4 bits. The prediction error value "26" is represented with 8 bits as "0b00011010" in binary, and the number of bits that are capable of representing "0b00011010" including the sign bit is 6 bits. The prediction error value "−3" is represented with 8 bits as "0b11111101" in binary, and the number of bits that are capable of representing "0b11111101" including the sign bit is 3 bits. Among these numbers of bits, the number-of-bit calculating part 18 selects the maximum number of bits, namely, 6 bits.

Also, the main bit packing part 20 limits the number of effective bits to, for example, "4", which is set in advance, and packs the prediction error values with this number of effective bits. At this time, the numbers of bits of the prediction error values to be packed are "4", "4", "6", and "3". Since "6", which exceeds the number of effective bits "4", is included, only the four most significant bits, corresponding to the number of effective bits, are adopted in order to reduce the number of bits to "4", which is the number of effective bits. That is, the prediction error value "4" is "0b00000100" in binary. Among the six bits "000100", the two least significant bits are rounded off, and the four most significant bits are extracted to obtain "0001". Also, the prediction error value "5" is "0b00000101" in binary. Among the six bits "000101", the two least significant bits "01" are rounded off, and only the four most significant bits are extracted to obtain "0001". Also, the prediction error value "26" is "0b00011010" in binary. Among the six bits "011010", the two least significant bits "10" are rounded off, and only the four most significant bits are extracted to obtain "0110". Also, the prediction error value "−3" is "0b11111101" in binary. Among the six bits "111101", the two least significant bits "01" are rounded off, and only the four most significant bits are extracted to obtain "1111".

As above, the prediction error values "4", "5", "26", and "−3" are encoded to "0001", "0001", "0111", and "1111", respectively, with 4 bits, which is the number of effective bits.

In contrast, encoding errors involved in the encoding above are as follows. That is, "0001" is the result of rounding off the two least significant bits; the two least significant bits are added to "0001" to obtain 8-bit "00000100". Thus, the encoding error is "00000100"="4". Also, the two least significant bits are added to "0111" to obtain 8-bit "00011100"="28". Also, the two least significant bits are added to "1111" to obtain 8-bit "11111100"="−4". In FIG. 3, the encoding errors of the prediction error values "4", "5", "26", and "−3" are indicated as "4", "4", "28", and "−4", respectively. The image quantizing unit 26 calculates these encoding error values and sends the encoding error values as a feedback to the prediction unit 12.

Also, since the additional bit packs are the rounded-off two least significant bits themselves, the additional bit packs are "00", "01", "10", and "01" with respect to the prediction error values "4", "5", "26", and "−3", respectively.

The difference between the first and second exemplary embodiments becomes clear by comparing FIG. 3 in the first exemplary embodiment with FIG. 6 in the second exemplary embodiment. The bit pack and the encoding error of the prediction error value "26" are different between the first and second exemplary embodiments.

FIG. 7A illustrates an example of encoded data (encoded image data) 100 output from the main code output unit 24, and FIG. 7B illustrates an example of additional code data 101 output from the additional code output unit 25. The encoded prediction error values "0001", "0001", "0111", and "1111" are packed in units of blocks to constitute the error part 104, and the header 102 defining 6 bits, which is the maximum number of bits of the prediction errors of a corresponding block, is added at the beginning. That is, the encoded data 100 includes the encoded prediction error values and is constituted of the number of bits and error values. Error values are limited to 4 bits, which is the number of effective bits, and errors with the number of bits greater than 4 bits do not exist.

Meanwhile, the additional code data 101 includes the two-least-significant-bit group 105. Using the additional code data 101 and the two-least-significant-bit group 105, the original image is decoded with a high image quality. There is no header, defining the number of bits, at the beginning of the additional code data 101. However, the number of bits of the additional code may be defined in the header of the additional code data 101. According to the second exemplary embodiment, as in the first exemplary embodiment, the original image is decoded with a high image quality using the additional code data 101.

Third Exemplary Embodiment

Figure 8:
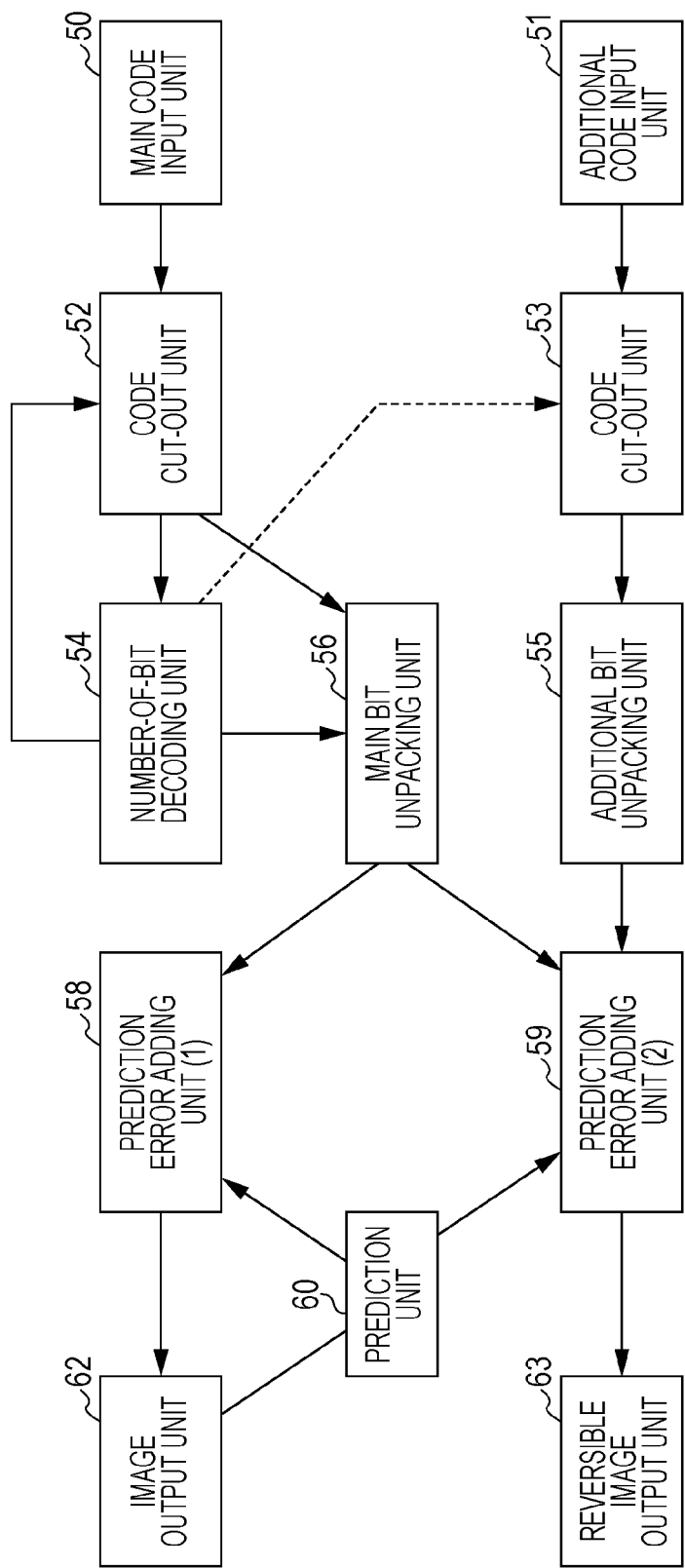
FIG. 8 is a block diagram illustrating the configuration of an image decoding apparatus according to a third exemplary embodiment.

FIG. 8 is a block diagram illustrating the configuration of an image decoding apparatus according to a third exemplary embodiment. The image decoding apparatus includes a main code input unit 50, a code cut-out unit 52, a number-of-bit decoding unit 54, a main bit unpacking unit 56, a prediction error adding unit (1) 58, a prediction unit 60, an image output unit 62, an additional code input unit 51, a code cut-out unit 53, an additional bit unpacking unit 55, a prediction error adding unit (2) 59, and a reversible image output unit 63.

The main code input unit 50 is a functional block corresponding to the main code output unit 24 illustrated in FIG. 1. The main code input unit 50 obtains image data encoded by the image encoding apparatus illustrated in FIG. 1. An example of the encoded image data is, for example, as illustrated in FIG. 4A.

The code cut-out unit 52 cuts out the next code from the encoded image data in accordance with the number of bits and bit packing involved therein. Specifically, the number of effective bits in the image encoding apparatus is known to the image decoding apparatus. Using this number of effective bits, the code cut-out unit 52 cuts out a code. For example, in encoded image data such as that illustrated in FIG. 4A, when the number of effective bits is 4 bits, the code cut-out unit 52 cuts out "0001" as 4-bit encoded data, "0001" as the next 4-bit encoded data, "0110" as the next 4-bit encoded data, and "1111" as the next 4-bit encoded data. Also, the code cut-out unit 52 cuts out information of the number of bits, which is included in the header of the encoded image data. The code cut-out unit 52 outputs the number-of-bit information included in the header to the number-of-bit decoding unit 54, and outputs the sequentially cut-out pieces of 4-bit data, namely, the encoded prediction error values, to the main bit unpacking unit 56.

The number-of-bit decoding unit 54 is a functional block corresponding to the number-of-bit encoding part 22 illustrated in FIG. 1. The number-of-bit decoding unit 54 performs the inverse process of the process performed by the number-of-bit encoding part 22, and decodes the number of bits. Accordingly, for example, the number of bits of the prediction error value is decoded to 6 bits.

The main bit unpacking unit 56 is a functional block corresponding to the main bit packing part 20 illustrated in FIG. 1. The main bit unpacking unit 56 performs the inverse process of the process performed by the main bit packing part 20, and calculates a prediction error value. That is, when a prediction error value is represented with 6 bits, since the number of effective bits is 4 bits, which is known, the two least significant bits are truncated (or rounded) at the time of encoding, and only the four most significant bits are extracted and encoded. Thus, a prediction error value is calculated by adding "00" to the two least significant bits of the 4-bit data.

The prediction error adding unit (1) 58 is a functional block corresponding to the prediction error calculating unit 14 illustrated in FIG. 1. The prediction error adding unit (1) 58 performs the inverse process of the process performed by the prediction error calculating unit 14, and calculates a decoded pixel value (expanded pixel value). Specifically, a decoded pixel value is calculated by adding the prediction error value to the predicted value of the pixel of interest, which has been predicted by the prediction unit 60. The prediction error adding unit (1) 58 outputs the decoded (expanded) pixel value to the image output unit 62.

The prediction unit 60 is a functional block corresponding to the prediction unit 12 illustrated in FIG. 1. The prediction unit 60 calculates the predicted value of the pixel of interest on the basis of the decoded pixel value. Specifically, the decoded pixel value serves, as it is, as the predicted value of the next pixel of interest. The prediction error adding unit (1) 58 decodes the pixel value of the pixel of interest by adding the prediction error value to the pixel value predicted by the prediction unit 60. The prediction error adding unit (1) 58 outputs the decoded (expanded) pixel value to the image output unit 62.

Meanwhile, the additional code input unit 51 is a functional block corresponding to the additional code output unit 25 in FIG. 1, and obtains additional code data encoded by the image encoding apparatus in FIG. 1. An example of the encoded additional code is, for example, as illustrated in FIG. 4B.

The code cut-out unit 53 cuts out the next code from the encoded additional code data in accordance with the number of bits and bit packing involved therein. Specifically, the number of effective bits in the image encoding apparatus is known to the image decoding apparatus. The maximum number of bits is detectable from the header of encoded data. It is thus possible to calculate the number of bits of an additional code, and, using this number of bits, a code is cut out. For example, in encoded image data such as that illustrated in FIG. 4A, the number of effective bits is 4 bits and the maximum number of bits is 6 bits. Thus, as the number of bits of an additional code, the code cut-out unit 53 cuts out "00" as 2-bit encoded data, "01" as the next 2-bit encoded data, "10" as the next 2-bit encoded data, and "01" as the next 2-bit encoded data. The code cut-out unit 53 outputs the sequentially cut-out pieces of 2-bit data, namely, the encoded additional prediction error values, to the additional bit unpacking unit 55.

The additional bit unpacking unit 55 is a functional block corresponding to the additional bit packing part 23 in FIG. 1.

The additional bit unpacking unit 55 performs the inverse process of the process performed by the additional bit packing part 23, and calculates a prediction error value. That is, the additional bit unpacking unit 55 calculates an additional error value from the two-bit encoded additional error value: 0 in the case of "00", 2 in the case of "10", and so forth.

The prediction error adding unit (2) 59 calculates a decoded pixel value (extended pixel value) by adding the additional error value obtained by the additional bit unpacking unit 55 to the predicted value of the pixel of interest, obtained by the prediction unit 60. The decoded pixel value is an image that is the result of adding the additional error value to the image output from the image output unit 62 and is a reversible image. The prediction error adding unit (2) 59 outputs the obtained decoded pixel value to the reversible image output unit 63.

In this manner, in the third exemplary embodiment, there are two types of decoded images: an image output from the image output unit 62 and an image output from the reversible image output unit 63. An image output from the image output unit 62 is an image that has been decoded without paying attention to additional error values and is an irreversible image with a relatively low image quality. An image output from the reversible image output unit 63 is an image that has been decoded by taking into consideration additional error values and is a reversible image with a relatively high image quality. The user may arbitrarily select one of these images and obtain a decoded image. For example, when the user wants to obtain an image with a normal image quality, the user obtains an irreversible image output from the image output unit 62. Next, when the user later wants to obtain an image with a higher image quality, the user may obtain a reversible image output from the reversible image output unit 63. A reversible image is obtained in the case where additional codes are input from the additional code input unit 51. Therefore, when additional code data is input together with encoded data, an image from the image output unit 62 and an image from the reversible image output unit 63 may be output at the same time. Needless to say, the user may only have a reversible image output from the reversible image output unit 63.

FIG. 9 illustrates the relationship among the maximum number of bits, the number of bits of a main code, and the number of bits of an additional code. As described above, the following relationship holds true:

the number of bits of an additional code=the maximum number of bits−the number of bits of a main code.

For example, when the maximum number of bits is 8 bits and the number of bits of a main code is 4 bits, the number of bits of an additional code is 4 bits. Since the maximum number of bits is detectable from the header 102 of the encoded data 100 and the number of bits of a main code has been set in advance in the encoding apparatus and the decoding apparatus and is thus known, the number of bits of an additional code is uniquely determined, and, an additional error value is calculated on the basis of the number of bits of an additional code. The number-of-bit decoding unit 54 calculates the number of bits of an additional code by performing the above-described arithmetic operation, and outputs the number of bits of an additional code to the code cut-out unit 53. The code cut-out unit 53 sequentially cuts out additional codes by using the supplied number of bits.

Fourth Exemplary Embodiment

Figure 10:
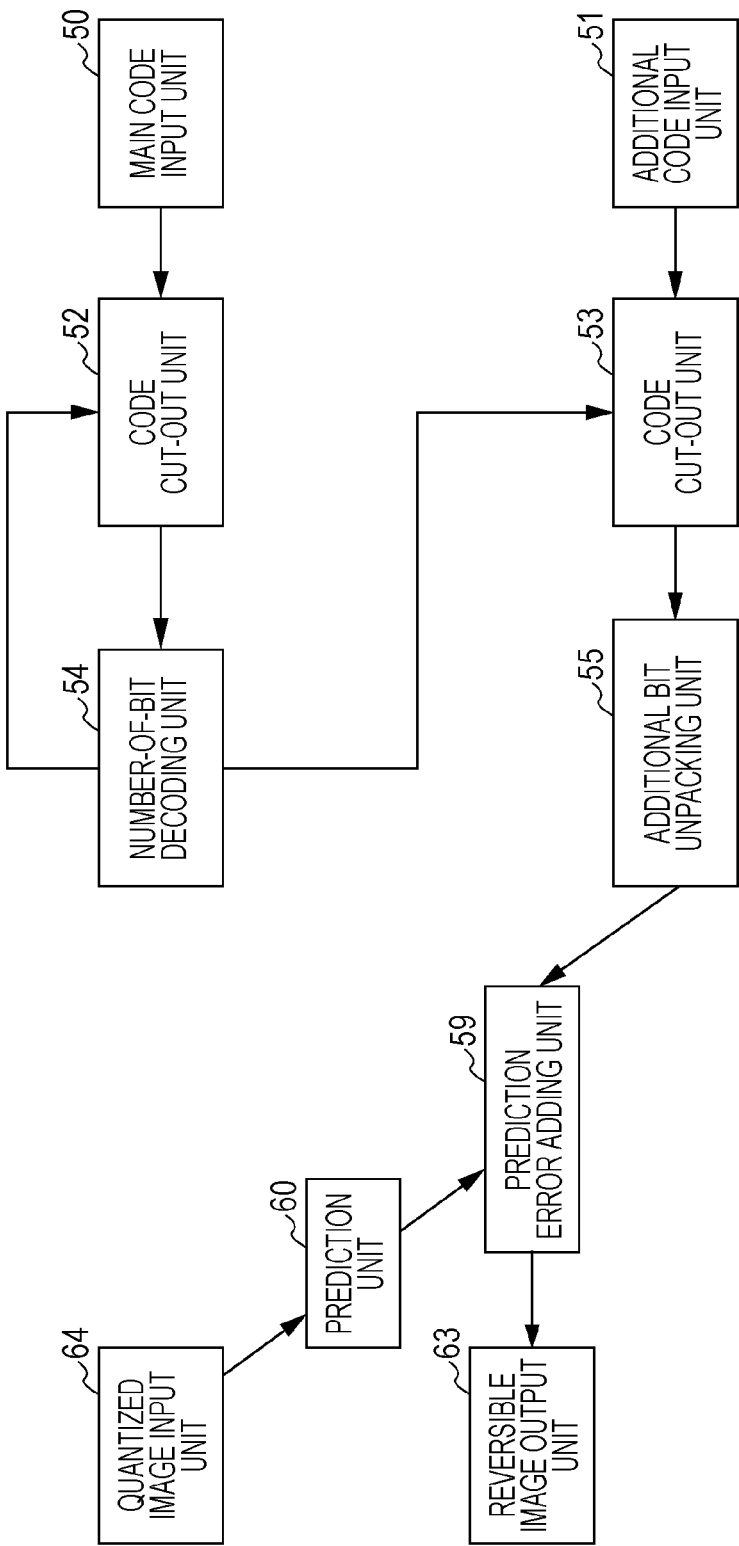
FIG. 10 is a block diagram illustrating the configuration of an image decoding apparatus according to a fourth exemplary embodiment.

FIG. 10 is a block diagram illustrating the configuration of an image decoding apparatus according to a fourth exemplary embodiment. In the fourth exemplary embodiment illustrated in FIG. 10, after an image (hereinafter this image will be referred to as a quantized image by taking into consideration the fact that this image is an irreversible image with a relatively low image quality) is obtained from the image output unit 62, a reversible image is obtained by using the quantized image.

In FIG. 10, the main code input unit 50, the code cut-out unit 52, the number-of-bit decoding unit 54, the additional code input unit 51, the code cut-out unit 53, the additional bit unpacking unit 55, the prediction error adding unit 59, the prediction unit 60, and the reversible image output unit 63 are the same as those illustrated in FIG. 8. However, the main bit unpacking unit 56, the prediction error adding unit (1) 58, and the image output unit 62 illustrated in FIG. 9 do not exist in FIG. 10, and, instead, a quantized image input unit 64 exists in FIG. 10.

The number-of-bit decoding unit 54 calculates the number of bits of an additional code by using the maximum number of bits from the code cut-out unit 52, and supplies the number of bits of an additional code to the code cut-out unit 53. The code cut-out unit 53 sequentially cuts out additional codes and supplies the additional codes to the additional bit unpacking unit 55. The additional bit unpacking unit 55 calculates additional error values by decoding the additional codes, and supplies the additional error values to the prediction error adding unit 59.

Meanwhile, the quantized image input unit 64 receives, as an input, a quantized image output from the image output unit 62, and supplies the quantized image to the prediction unit 60. The prediction unit 60 supplies the quantized image to the prediction error adding unit 59.

The prediction error adding unit 59 generates a reversible image by adding an additional error value obtained by the additional bit unpacking unit 55 to a pixel of interest of the quantized image, and supplies the reversible image to the reversible image output unit 63.

In the fourth exemplary embodiment, when the user first wants to obtain an irreversible quantized image with a relatively low image quality and then obtain a reversible image with a relatively high image quality, a reversible image is obtained by inputting additional codes from the additional code input unit 51.

Fifth Exemplary Embodiment

FIGS. 11A to 11C illustrate encoding formats according to a fifth exemplary embodiment. In the fifth exemplary embodiment, a bit code is not added to the header of encoded data, but is encoded and sent as a separate stream. FIG. 11A illustrates an example of a bit code. FIG. 11B illustrates exemplary main codes. FIG. 11C illustrates exemplary additional codes. The bit code is the maximum number of bits in encoding, such as 6 bits. The main codes are, for example, "0001", "0001", "0110", and "1111", as has been described in the first exemplary embodiment. The additional cods are "00", "01", "10", and "01", as has been described in the first exemplary embodiment. These are sent as separate streams from the image encoding apparatus. Thus, the image decoding apparatus needs to receive these codes and decode the original image.

Figure 12:
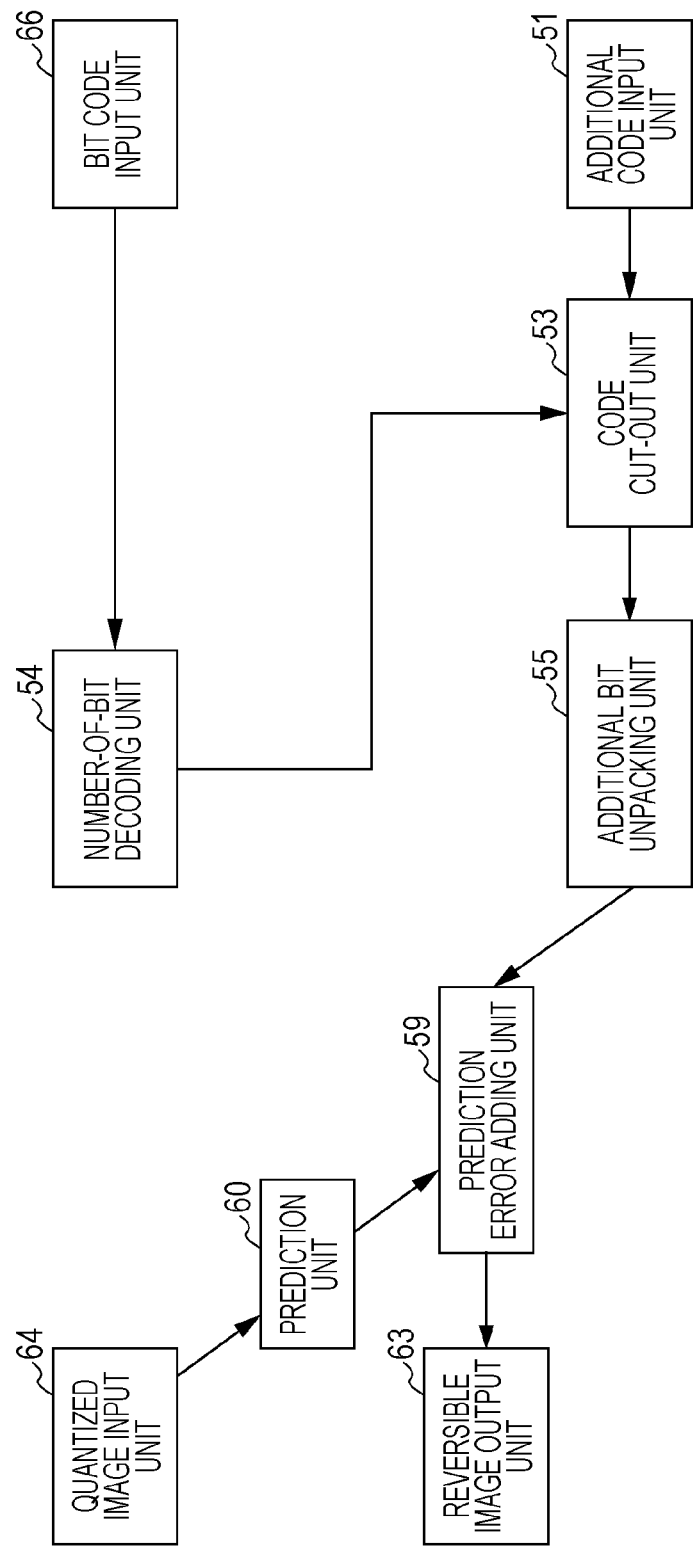
FIG. 12 is a block diagram illustrating the configuration of an image decoding apparatus according to the fifth exemplary embodiment.

FIG. 12 is a block diagram illustrating the configuration of an image decoding apparatus according to the fifth exemplary embodiment. The fifth exemplary embodiment is for obtaining, after a quantized image is obtained from the image output unit 62, a reversible image using the quantized image, as in the fourth exemplary embodiment.

A bit code input unit 66 receives, as an input, a bit code sent as a separate stream and supplies the bit code to the number-of-bit decoding unit 54. The number-of-bit decoding unit 54 calculates the number of bits of an additional code by subtracting the number of effective bits from the bit code, and supplies the calculated number of bits to the code cut-out unit 53. The code cut-out unit 53 sequentially cuts out additional codes and supplies the additional codes to the additional bit unpacking unit 55. The additional bit unpacking unit 55 calculates additional error values by decoding the additional codes, and supplies the additional error values to the prediction error adding unit 59.

Meanwhile, the quantized image input unit 64 receives, as an input, a quantized image output from the image output unit 62, and supplies the quantized image to the prediction unit 60. The prediction unit 60 supplies the quantized image to the prediction error adding unit 59.

The prediction error adding unit 59 generates a reversible image by adding an additional error value obtained by the additional bit unpacking unit 55 to a pixel of interest of the quantized image, and supplies the reversible image to the reversible image output unit 63.

In the fifth exemplary embodiment, when the user first wants to obtain an irreversible quantized image with a relatively low image quality and then obtain a reversible image with a relatively high image quality, a reversible image is obtained by inputting a bit code from the bit code input unit 66 and inputting additional codes from the additional code input unit 51.

Sixth Exemplary Embodiment

Figure 13:
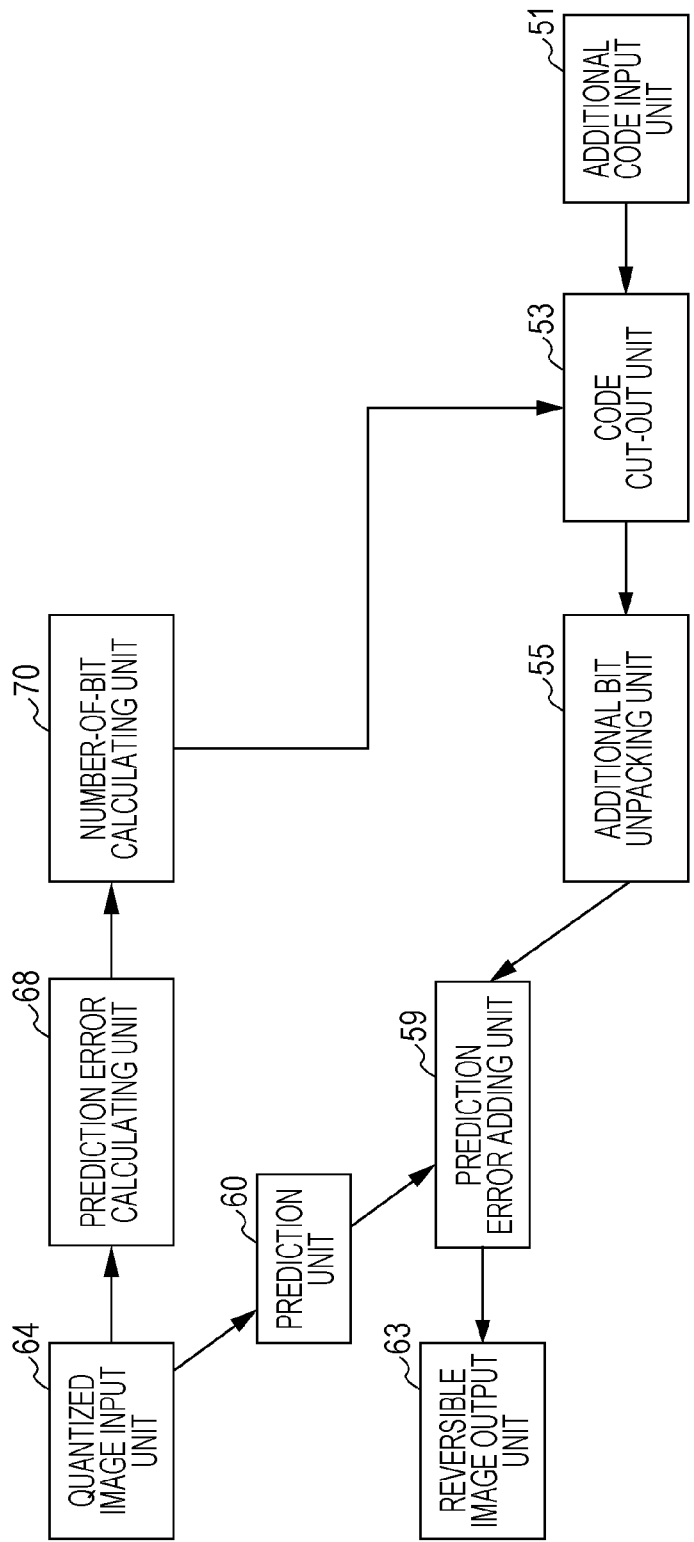
FIG. 13 is a block diagram illustrating the configuration of an image decoding apparatus according to a sixth exemplary embodiment.

FIG. 13 is a block diagram illustrating the configuration of an image decoding apparatus according to a sixth exemplary embodiment. The sixth exemplary embodiment is an exemplary embodiment in which the number of bits is calculated from an already obtained quantized image without inputting a bit code.

The quantized image input unit 64 receives, as an input, the quantized image that has already been output from the image output unit 62, and supplies the quantized image to the prediction unit 60 and to a prediction error calculating unit 68.

The prediction error calculating unit 68 operates in the same or like manner as the prediction error calculating unit 14 shown in FIG. 1. The prediction error calculating unit 68 calculates the difference between the predicted value and the actual pixel value of the pixel of interest. For example, when the predicted value of the pixel of interest is 16 and the actual pixel value of the pixel of interest is 20, a prediction error is calculated as: 20−16=4. The prediction error calculating unit 68 outputs the calculated prediction error to a number-of-bit calculating unit 70.

The number-of-bit calculating unit 70 operates in the same or like manner as the number-of-bit calculating part 18 shown in FIG. 1. The number-of-bit calculating unit 70 calculates the number of bits that are capable of representing the prediction error value calculated by the prediction error calculating unit 68. For example, when the prediction error value is 4, since 4 is 0100 in binary, the number-of-bit calculating part 18 calculates the number of bits as 4. When the prediction error value is 26, since 26 is 011010 in binary, the number-of-bit calculating part 18 calculates the number of bits as 6. When calculating the number of bits of the prediction error value, the number-of-bit calculating unit 70 calculates the number of bits by including the sign bit because the prediction error value may be a negative value. Among the numbers of bits of prediction errors of pixels to be processed, the number-of-bit calculating unit 70 selects the maximum number of bits, subtracts the number of effective bits from the selected maximum number of bits, and outputs the subtraction result to the code cut-out unit 53. For example, when the maximum number of bits is 6 bits and the number of effective bits is 4 bits, 6−4=2 bits are supplied to the code cut-out unit 53. The operation thereafter is the same as that shown in FIG. 12.

According to the sixth exemplary embodiment, the maximum number of bits is calculated from the quantized image, and additional error values are decoded without inputting a bit code.

Various image decoding apparatuses have been described so far in the third to sixth exemplary embodiments. These image decoding apparatuses according to the third to sixth exemplary embodiments have characteristics. FIG. 14 illustrates the characteristics in the case where the third exemplary embodiment is case 1, the fourth exemplary embodiment is case 2, the fifth exemplary embodiment is case 3, and the sixth exemplary embodiment is case 4. In FIG. 14, an example in the case where decoding is performed without paying attention to additional codes is also illustrated as case 1 of a quantized output for the sake of comparison.

In the image decoding apparatus according to the third exemplary embodiment, the image encoding apparatus sends main codes and additional codes, and the image decoding apparatus receives these main and additional codes, and outputs a quantized image and a reversible image. In a server client system, when the image encoding apparatus is placed at the server side, main codes and additional codes are prepared at the server, and the codes are transferred with an image quality in response to the client's request. When the client requests a relatively low image quality, only main codes are sent, thereby outputting a quantized image. When the client requests a relatively high image quality, main codes and additional codes are sent, thereby outputting a reversible image.

In the image decoding apparatus according to the fourth exemplary embodiment, the quantized image has already been obtained, and thereafter the server sends only additional codes. Because the main bit unpacking unit 56 and so forth are unnecessary, the configuration is accordingly simplified. The quantized image is held in, for example, a memory of the image decoding apparatus, and a reversible image is output by reading the quantized image from the memory and inputting the quantized image.

Also in the image decoding apparatus according to the fifth exemplary embodiment, the quantized image has already been obtained, and thereafter the server sends only additional codes. Because the main bit unpacking unit 56 and so forth are unnecessary, the configuration is accordingly simplified. Also, because it is unnecessary to cut out and decode main codes and a bit code is input, the processing becomes faster. However, it is necessary to have a bit code as a separate stream. The quantized image is held in a memory of the image decoding apparatus, and a reversible image is output by reading the quantized image from the memory and inputting the quantized image.

Also in the image decoding apparatus according to the sixth exemplary embodiment, the quantized image has already been obtained, and thereafter the server sends only additional codes. Because a bit code or the maximum number of bits is generated from the quantized image by performing an arithmetic operation, it is unnecessary to obtain the maximum number of bits from a main code, to input the maximum number of bits as a bit code, or to separately hold the maximum number of bits in a memory. However, partial encoding (compression) is necessary when a bit code or the maximum number of bits is calculated from the quantized image.

In the fourth to sixth exemplary embodiments, first the server unconditionally sends main codes, and thereafter, only in response to an additional request from the client, the server sends additional codes, thereby outputting a reversible image.

Other Exemplary Embodiments

Although the exemplary embodiments of the invention have been described as above, the exemplary embodiments are not limited to those described above, and various modifications are possible.

For example, the image encoding apparatus encodes, as an additional code, all the least significant bits lower than the number of effective bits as an additional code. However, the image encoding apparatus may perform encoding in two levels: encoding the most significant bit out of the least significant bits, and encoding all the least significant bits. Specifically, when the maximum number of bits is 6 bits and the number of effective bits is 4 bits, the two least significant bits are a target serving as an additional code. The most significant bit out of the two least significant bits is encoded as a first additional code, and all the two least significant bits are encoded as a second additional code.

In contrast, when an image with a standard image quality is requested in the image decoding apparatus, decoding is performed using only main codes, and a quantized image is output. When an image with a high image quality is requested, decoding is performed using main codes and first additional codes, and a high quality image is output. Further, when a reversible image is requested, decoding is performed using main codes and second additional codes, and a reversible image is output. In this manner, three levels of image decoding, namely, standard, high image quality, and reversible, may be performed.

Alternatively, the most significant bit out of the least significant bits may be encoded as a first additional code, and the remaining bit(s) of the least significant bits may be encoded as a second additional code. In this case, an image obtained by decoding is recursively used. First additional codes are applied to the quantized image, and then second additional codes are used for an image as a result of applying the first additional codes to the quantized image, thereby sequentially improving the image quality.

In the case of the fourth to sixth exemplary embodiments, the user, who is a client, obtains a quantized image and then requests additional codes from the server. Alternatively, a tag indicating "reversible image or high quality image" may be added to part of the quantized image, and, when the user clicks this tag, additional codes may be requested from the server.

In the image decoding apparatus, a reversible image is generated together with or after obtaining a quantized image. However, the image decoding apparatus does not necessarily generate a reversible image. In short, it is only necessary to generate an image with a relatively high image quality from an image with a relatively low image quality by using additional code data. How high the image quality is may be determined in accordance with a request from the user, who is a client. When the server encodes additional error values, holds the encoded additional error values as additional codes, and sends the additional codes in response to the user's request, it is unnecessary to encode the image every time the occasion arises, and a request for changing the image quality may be handled. A reversible image is output by encoding and sending all the least significant bits as an additional code, and an image with a relatively high image quality, though it is irreversible, is output by encoding and sending any of the least significant bits as an additional code.

One example of application of the exemplary embodiments is encoding and decoding of a medical image. At first, an image with a relatively low image quality is sent to the user, and necessary screening is performed. Upon necessity of a more detailed image, the user requests an image with a relatively high image quality from the server. In response to this request, the server sends additional codes to the user. The user generates an image with a relatively high image quality by adding additional error values, obtained by decoding the additional codes, to the already held image with a relatively low image quality, and performs detailed examination. The exemplary embodiments of the invention clearly have advantages from an efficiency perspective over the case in which the server holds in advance a low quality image and a high quality image and sends one of the images to the client as occasion calls.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image encoding apparatus comprising:
    an input unit configured to receive, as an input, image data;
    a prediction unit configured to calculate a first predicted pixel value of a pixel of interest serving as a target to be processed in the image data;
    a prediction error calculating unit configured to calculate a prediction error value by using an actual pixel value and the predicted pixel value of the pixel of interest;
    a main encoder configured to encode at least part of the prediction error value to generate encoded information including a number of bits and an error value, the main encoder encoding, as the error value, only one or more most significant bits corresponding to a number of effective bits when the number of bits exceeds the number of effective bits; and
    an additional encoder configured to encode one or more least significant bits of the prediction error value, excluding the one or more most significant bits corresponding to the number of effective bits, as an additional error value.

2. The image encoding apparatus according to claim 1, further comprising:
    a quantization unit configured to quantize the error value encoded by the main encoder; and
    a feedback unit configured to send, as a feedback, the quantized error value to the prediction unit,
    wherein the prediction unit calculates a second predicted pixel value of the pixel of interest by using the feedback.

3. The image encoding apparatus according to claim 2, wherein the main encoder is configured to use, as the number of bits, a maximum value from among a plurality of numbers of bits representing a plurality of prediction errors of a plurality of pixels included in a block of an image.

4. The image encoding apparatus according to claim 1, wherein the main encoder is configured to use, as the number of bits, a maximum value from among a plurality of numbers of bits representing a plurality of prediction errors of a plurality of pixels included in a block of an image.

5. The image encoding apparatus according to claim 1, wherein the number of bits included in the encoded information is (i) a minimum number of bits capable of representing the prediction error value in a binary format and (ii) a sign bit.

6. The image encoding apparatus according to claim 1, wherein the number of effective bits is set in advance of the calculation of the prediction error value.

7. A non-transitory computer readable medium storing a program causing a computer to execute a process, the process comprising:
inputting image data to the computer;
calculating a first predicted pixel value of a pixel of interest serving as a target to be processed in the image data;
calculating a prediction error value by using an actual pixel value and the predicted pixel value of the pixel of interest;
encoding at least part of the prediction error value to generate encoded information including a number of bits and an error value, in which only one or more most significant bits corresponding to a number of effective bits are encoded as the error value when the number of bits exceeds the number of effective bits; and
encoding one or more least significant bits of the prediction error value, excluding the one or more most significant bits corresponding to the number of effective bits, as an additional error value.

8. The non-transitory computer readable medium of claim 7, wherein the process further comprises:
quantizing the encoded error value;
sending, as a feedback, the quantized error value to a prediction unit which calculates the first predicted pixel value; and
calculating, using the prediction unit, a second predicted pixel value of the pixel of interest by using the feedback.

9. The non-transitory computer readable medium according to claim 7, wherein the encoding the at least part of the prediction error value comprises using, as the number of bits, a maximum value from among a plurality of numbers of bits representing a plurality of prediction errors of a plurality of pixels included in a block of an image.

10. The non-transitory computer readable medium according to claim 7, wherein the number of bits included in the encoded information is (i) a minimum number of bits capable of representing the prediction error value in a binary format and (ii) a sign bit.

11. The non-transitory computer readable medium according to claim 7, wherein the number of effective bits is set in advance of the calculation of the prediction error value.

12. An image encoding method comprising:
inputting image data to a computer;
calculating a first predicted pixel value of a pixel of interest serving as a target to be processed in the image data;
calculating a prediction error value by using an actual pixel value and the predicted pixel value of the pixel of interest;
encoding at least part of the prediction error value to generate encoded information including a number of bits and an error value, in which only one or more most significant bits corresponding to a number of effective bits are encoded as the error value when the number of bits exceeds the number of effective bits; and
encoding one or more least significant bits of the prediction error value, excluding the one or more most significant bits corresponding to the number of effective bits, as an additional error value.

13. The image encoding method of claim 12, further comprising:
quantizing the encoded error value;
sending, as a feedback, the quantized error value to a prediction unit which calculates the first predicted pixel value; and
calculating, using the prediction unit, a second predicted pixel value of the pixel of interest by using the feedback.

14. The image encoding method according to claim 12, wherein the encoding the at least part of the prediction error value comprises using, as the number of bits, a maximum value from among a plurality of numbers of bits representing a plurality of prediction errors of a plurality of pixels included in a block of an image.

15. The image encoding method according to claim 12, wherein the number of bits included in the encoded information is (i) a minimum number of bits capable of representing the prediction error value in a binary format and (ii) a sign bit.

16. The image encoding method according to claim 12, wherein the number of effective bits is set in advance of the calculation of the prediction error value.

* * * * *